J. H. Elward.
Harrow.

Nº 40,614.  Patented Nov. 17, 1863.

Witnesses,
John C. Kennedy
Julius Horsh

Inventor,
John H. Elward
by his attys
Brelger & Cohen

UNITED STATES PATENT OFFICE.

JOHN H. ELWARD, OF OTTAWA, ILLINOIS.

IMPROVEMENT IN HARROWS.

Specification forming part of Letters Patent No. 40,614, dated November 17, 1863.

*To all whom it may concern:*

Be it known that I, JOHN H. ELWARD, of Ottawa, in the county of La-Salle and State of Illinois, have invented certain new and useful Improvements in Combined Clod-Breaker and Harrow; and I do hereby declare that the following is a full, clear, and exact description of the construction and operation of the same, reference being had to the accompanying drawings, in which—

Figure 1:
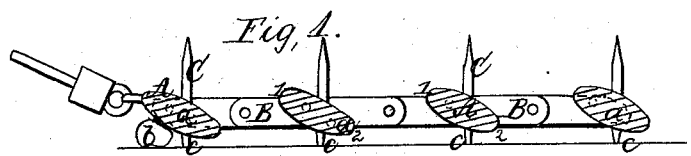
Figure 2:
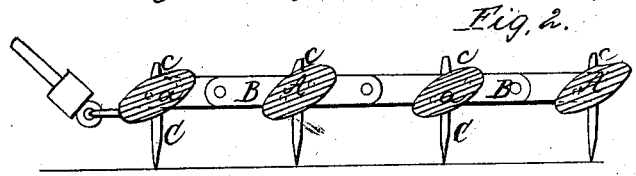
Figure 3:
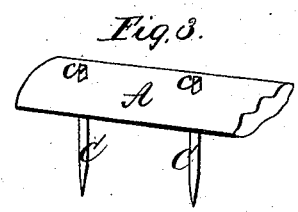
Figure 4:
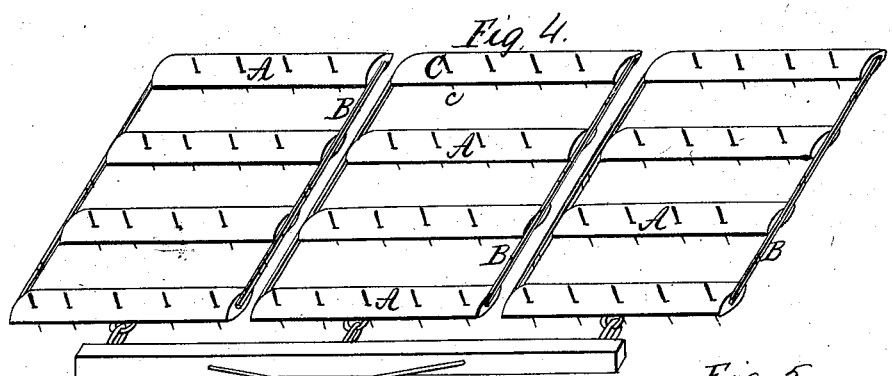
Figure 5:
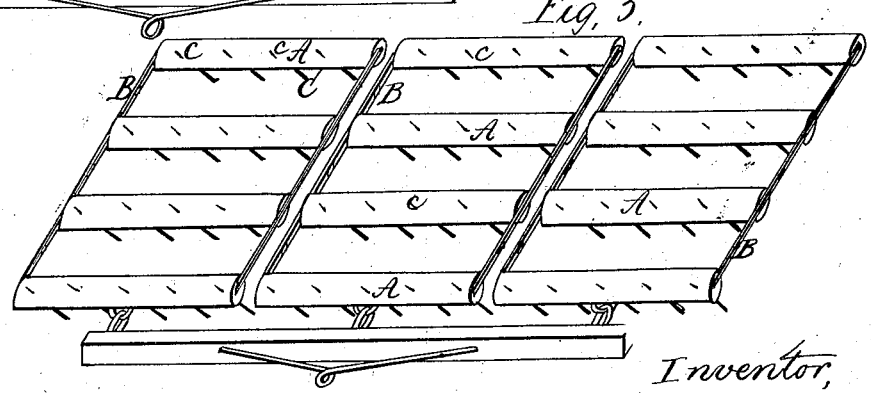

Figure 1 represents a longitudinal vertical section through the machine when used as a clod-breaker. Fig. 2 represents a longitudinal vertical section through the same when used as a harrow. Fig. 3 represents a detached view, hereinafter to be referred to. Fig. 4 represents a perspective view of the machine when used as a clod-breaker. Fig. 5 represents a perspective view of the machine when used as a harrow.

My invention relates to the combination of elliptical horizontal bars, linked together to constitute a harrow-frame, with spikes and projections of a certain construction, by which the clods are cut and crushed as the implement is drawn over the field.

To enable others skilled in the art to make and use my invention, I will proceed to describe its construction and operation.

A represents straight, convex, or elliptical bars, which are connected together by means of links or hinged joints B. The joints B are firmly secured to the ends of the bars A by means of nails or pins $a$.

C represents iron spikes or teeth, which are secured within the bars A. That part of the spikes C which is used in harrowing is of the ordinary shape of a harrow-tooth; but the part $c$, which is used in breaking clods, is a short tooth which may be a prolongation of the harrow-tooth, and which has a sharp inclined edge at its front, as represented in a perspective view in Fig. 3. The position of the bars A when used for breaking clods is such as represented in Fig. 1. They are inclined so that the front edge, 1, is raised higher above the ground than the rear edge, 2, and in passing over the ground the clods $b$ (represented in red) are caught by the inclined bars as the clods pass under the front edges, and as the bar advances the clod is cut by the short tooth, and is crushed as the bar passes clear over it. The bars A may be sufficiently weighted to perform said operation properly. The bars A being hinged together by means of the links B, they can adapt themselves to the inequalities of the ground, or can rise if heavy clods should accumulate under them which may not be crushed by the action of the first bar upon them. In that case the succeeding bars will perform the work as well by cutting up the clods by means of their teeth as by crushing them by their weight, and the bars by their peculiar shape are sure of catching all the clods which are in their track, and each bar leaves to the succeeding one the work which it has not completed.

Several harrows or clod-breakers, as described, may be secured to one whiffletree, to be pulled by one team.

When the apparatus is to be used as a harrow it is turned upside down, so that the harrow-teeth come in contact with the ground, and it then operates like an ordinary harrow.

Having thus fully described the nature of my invention, what I claim herein as new, and desire to secure by Letters Patent, is—

1. In combination with the convex or elliptical bars A, the short inclined teeth $c$, when constructed and operated substantially in the manner and for the purposes herein described.

2. In combination with the convex or elliptical bars A and short inclined teeth $c$, the links B, substantially in the manner and for the purposes described.

3. In combination with the elliptical hinged bars A, the harrow-teeth C and the short clod-breaking teeth $c$, when the latter are the prolongation of the former, substantially in the manner and for the purpose described.

J. H. ELWARD.

Witnesses:
JULIUS HIRSH,
E. COHEN.